US011829250B2

(12) United States Patent
Bharadwaj et al.

(10) Patent No.: US 11,829,250 B2
(45) Date of Patent: Nov. 28, 2023

(54) SYSTEMS AND METHODS FOR EFFICIENTLY BACKING UP LARGE DATASETS (71) Applicant: Veritas Technologies LLC, Santa Clara, CA (US)

(72) Inventors: Vaijayanti Bharadwaj, Pune (IN); Chirag Dalal, Pune (IN)

(73) Assignee: Veritas Technologies LLC, Santa Clara, CA (US)

(*) Notice: Subject to any disclaimer, the term of this patent is extended or adjusted under 35 U.S.C. 154(b) by 264 days.

(21) Appl. No.: 16/582,027

(22) Filed: Sep. 25, 2019

(65) Prior Publication Data
US 2021/0089406 A1   Mar. 25, 2021

(51) Int. Cl.
G06F 16/215   (2019.01)
G06F 16/22    (2019.01)
G06F 11/14    (2006.01)

(52) U.S. Cl.
CPC ...... *G06F 11/1453* (2013.01); *G06F 11/1464* (2013.01); *G06F 16/215* (2019.01); *G06F 16/2219* (2019.01)

(58) Field of Classification Search
CPC . G06F 16/215; G06F 16/2219; G06F 11/1464
See application file for complete search history.

(56) References Cited

U.S. PATENT DOCUMENTS 8,234,468 B1 * 7/2012 Deshmukh .......... G06F 11/1453
                                               711/E12.103
9,268,832 B1 * 2/2016 Challapalli ............. G06F 16/27
9,442,807 B1 * 9/2016 Zhang ................. G06F 16/1752
9,514,138 B1 * 12/2016 Natanzon ............ G06F 11/1453
10,235,285 B1 * 3/2019 Wallace ................ G06F 3/0608
10,382,380 B1 * 8/2019 Suzani .................. H04L 47/629
(Continued)

FOREIGN PATENT DOCUMENTS

WO   WO-2021/061831 A1   4/2021

OTHER PUBLICATIONS

International Search Report and Written Opinion received for PCT Application Serial No. PCT/US2020/052294 dated Dec. 18, 2020, 9 pages.
(Continued)

*Primary Examiner* — Ken Hoang
(74) *Attorney, Agent, or Firm* — Greenberg Traurig, LLP (57) ABSTRACT A computer-implemented method for efficiently backing up large datasets may include (i) identifying data on an application server to be deduplicated by a deduplication server and then stored on a backup server, (ii) dividing the data into subsets, and (iii) for each subset of data subsequent to an initial subset of data, (a) transferring the subset of data to the deduplication server in response to detecting that a previous subset of data has completed transfer to the deduplication server, (b) deduplicating the subset of data in response to detecting that the previous subset of data has completed deduplication, and (c) transferring a deduplicated version of the subset of data to the backup server in response to detecting that the subset of data has completed deduplication and the previous subset of data has completed transfer to the backup server. Various other methods, systems, and computer-readable media are also disclosed.

20 Claims, 5 Drawing Sheets (56) References Cited

U.S. PATENT DOCUMENTS

| | | | |
|---|---|---|---|
| 10,528,534 B2* | 1/2020 | Kabra | G06F 16/215 |
| 2012/0089854 A1* | 4/2012 | Breakstone | G06F 3/0665 |
| | | | 713/323 |
| 2013/0232284 A1* | 9/2013 | Akiyama | G06F 3/061 |
| | | | 710/23 |
| 2019/0243702 A1* | 8/2019 | Shilane | G06F 16/275 |

OTHER PUBLICATIONS

Liu et al., "A Novel Optimization Method to Improve De-duplication Storage System Performance", IEEE 15th International Conference on Parallel and Distributed Systems, Dec. 8, 2009, 8 pages.

Xia et al., "Accelerating Content-De ned-Chunking based Data Deduplication by Exploiting Parallelism", Future Generation Computer Systems, vol. 98, No. 9, Mar. 29, 2019, pp. 1-21.

\* cited by examiner

SYSTEMS AND METHODS FOR EFFICIENTLY BACKING UP LARGE DATASETS

BACKGROUND

In an era of constant connectivity, an inability to efficiently create and maintain backups of important data can be a severe liability. Computing devices are prone to a wide variety of both temporary and fatal errors, and even temporary losses of data or services may be devastating to enterprises. The ability to quickly recover systems from a backup is crucial to enterprises that wish to maintain consistent services. Just as important is the ability to quickly create backups. A backup that requires substantial time to create is less likely to be frequently updated, leading to potential data losses if a failure occurs between backups. Additionally, the more efficiently a backup can be created, the fewer resources an organization needs to devote to creating backups.

Minimizing the storage space consumed by backups is also important. Many traditional systems for creating backups engage in deduplication, a process by which duplicate data (often created for resiliency purposes) is eliminated from a dataset before storage, reducing the storage space needed to store the dataset. However, traditional systems may be inefficient at various points in the deduplication process, increasing the time and/or resources required to create a backup. Accordingly, the instant disclosure identifies and addresses a need for additional and improved systems and methods for efficiently backing up large datasets.

SUMMARY

As will be described in greater detail below, the instant disclosure generally relates to systems and methods for efficiently backing up large datasets by segmenting the data and using a pipeline to handle transferring, processing, and storing the data while minimizing the time that system resources are idle.

In one example, a computer-implemented method for efficiently backing up large datasets may include (i) identifying a set of data on an application server to be deduplicated by a deduplication server and stored on a backup server, (ii) dividing the set of data on the application server into a group of subsets of data, and (iii) for each subset of data subsequent to an initial subset of data, (a) transferring the subset of data to the deduplication server in response to detecting that a previous subset of data has completed transfer to the deduplication server, (b) deduplicating, by the deduplication server, the subset of data in response to detecting that the previous subset of data has completed deduplication by the deduplication server, and (c) transferring a deduplicated version of the subset of data to the backup server in response to detecting that the subset of data has completed deduplication and the previous subset of data has completed transfer to the backup server.

In some examples, dividing the set of data on the application server into the subsets of data may include dividing the set of data such that each subset is a unique dataset subject to deduplication independent of each other subset. Additionally or alternatively, dividing the set of data on the application server into the subsets of data may include dividing the set of data such that each subset occupies less space in storage than an amount of space in storage available on the deduplication server.

In one embodiment, the set of data may include a set of columns of a database on the application server. In some embodiments, the application server may include a cluster of application servers. In one embodiment, the deduplication server may include a cluster of deduplication servers.

In some examples, the application server may have a greater amount of storage than the deduplication server. In one embodiment, the deduplication server may have insufficient storage to store the set of data from the application server.

In one embodiment, a system for implementing the above-described method may include (i) an identification module, stored in memory, that identifies a set of data on an application server to be deduplicated by a deduplication server and stored on a backup server, (ii) a division module, stored in memory, that divides the set of data on the application server into a group of subsets of data, (iii) a transfer module, stored in memory, that, for each subset of data subsequent to an initial subset of data, transfers the subset of data to the deduplication server in response to detecting that a previous subset of data has completed transfer to the deduplication server, (iv) a deduplication module, stored in memory, that, for each subset of data subsequent to the initial subset of data, deduplicates, by the deduplication server, the subset of data in response to detecting that the previous subset of data has completed deduplication by the deduplication server, (v) a storage module, stored in memory, that, for each subset of data subsequent to the initial subset of data, transfers a deduplicated version of the subset of data to the backup server in response to detecting that the subset of data has completed deduplication and the previous subset of data has completed transfer to the backup server, and (vii) at least one physical processor that executes the identification module, the division module, the transfer module, the deduplication module, and the storage module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) identify a set of data on an application server to be deduplicated by a deduplication server and stored on a backup server, (ii) divide the set of data on the application server into a group of subsets of data, (iii) for each subset of data subsequent to an initial subset of data, (iv) transfer the subset of data to the deduplication server in response to detecting that a previous subset of data has completed transfer to the deduplication server, (v) deduplicate, by the deduplication server, the subset of data in response to detecting that the previous subset of data has completed deduplication by the deduplication server, and (vi) transfer a deduplicated version of the subset of data to the backup server in response to detecting that the subset of data has completed deduplication and the previous subset of data has completed transfer to the backup server.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification.

Together with the following description, these drawings demonstrate and explain various principles of the present disclosure.

Throughout the drawings, identical reference characters and descriptions indicate similar, but not necessarily identical, elements. While the example embodiments described herein are susceptible to various modifications and alternative forms, specific embodiments have been shown byway of example in the drawings and will be described in detail herein. However, the example embodiments described herein are not intended to be limited to the particular forms disclosed. Rather, the present disclosure covers all modifications, equivalents, and alternatives falling within the scope of the appended claims.

DETAILED DESCRIPTION OF EXAMPLE EMBODIMENTS

The present disclosure is generally directed to systems and methods for efficiently backing up large datasets. As will be explained in greater detail below, the systems and methods described herein may improve the functioning of a deduplication and backup system by reducing idle time on various system resources and/or improving the speed at which data is processed from production data into a backup. In some examples, by segmenting and then pipelining the data, the systems described herein may increase the percentage of time that system resources are engaged, reducing the overall time required to transfer multiple segments of data to a deduplication server, deduplicate the data, and then transfer the deduplicated data to a backup server. Moreover, the systems and methods described herein may improve the functioning and/or performance of a server configured to create backups by improving resource utilization. These systems and methods may also improve the field of backup systems by providing faster backup operations.

Figure 1:
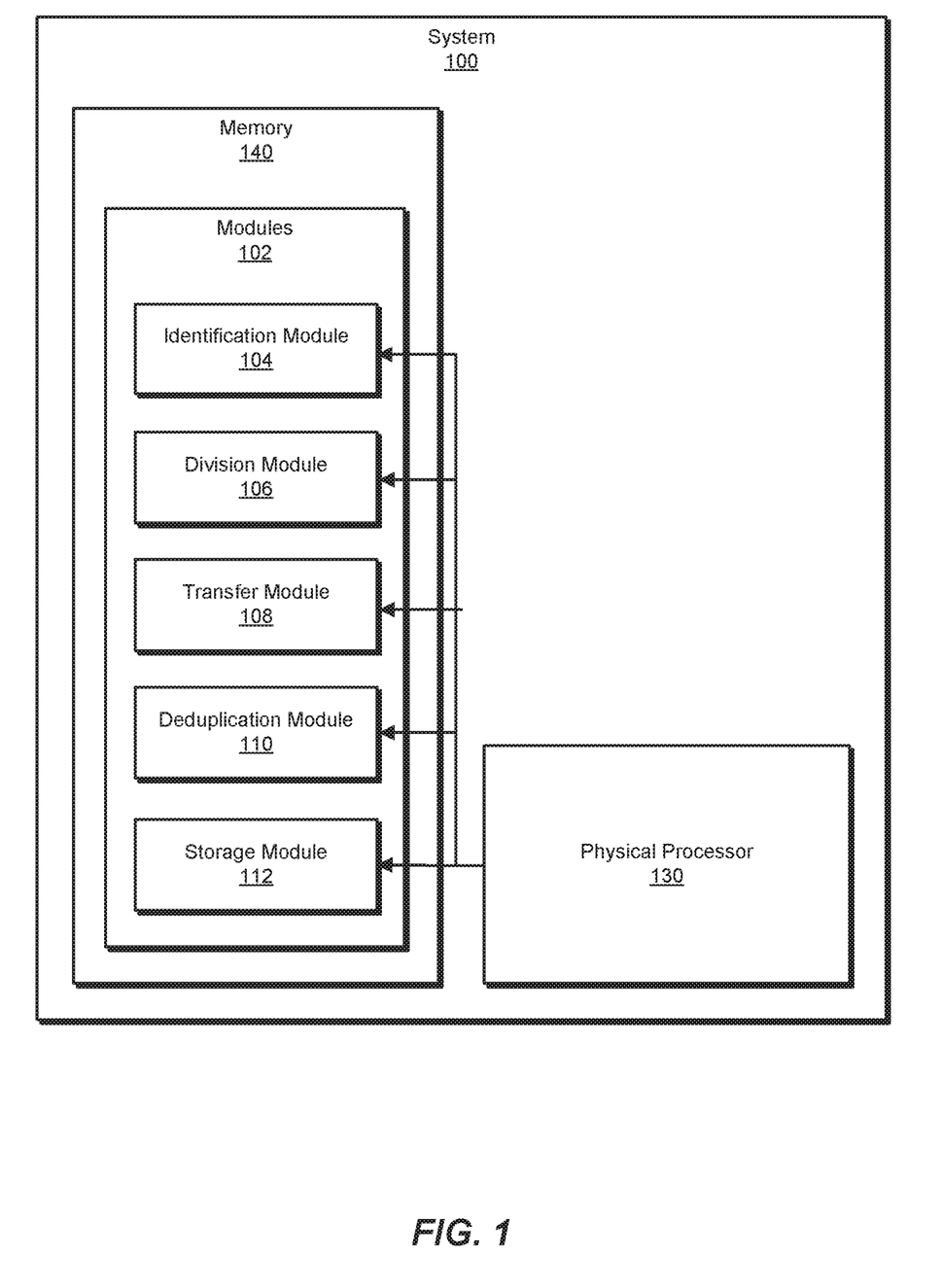
FIG. 1 is a block diagram of an example system for efficiently backing up large datasets.
Figure 2:
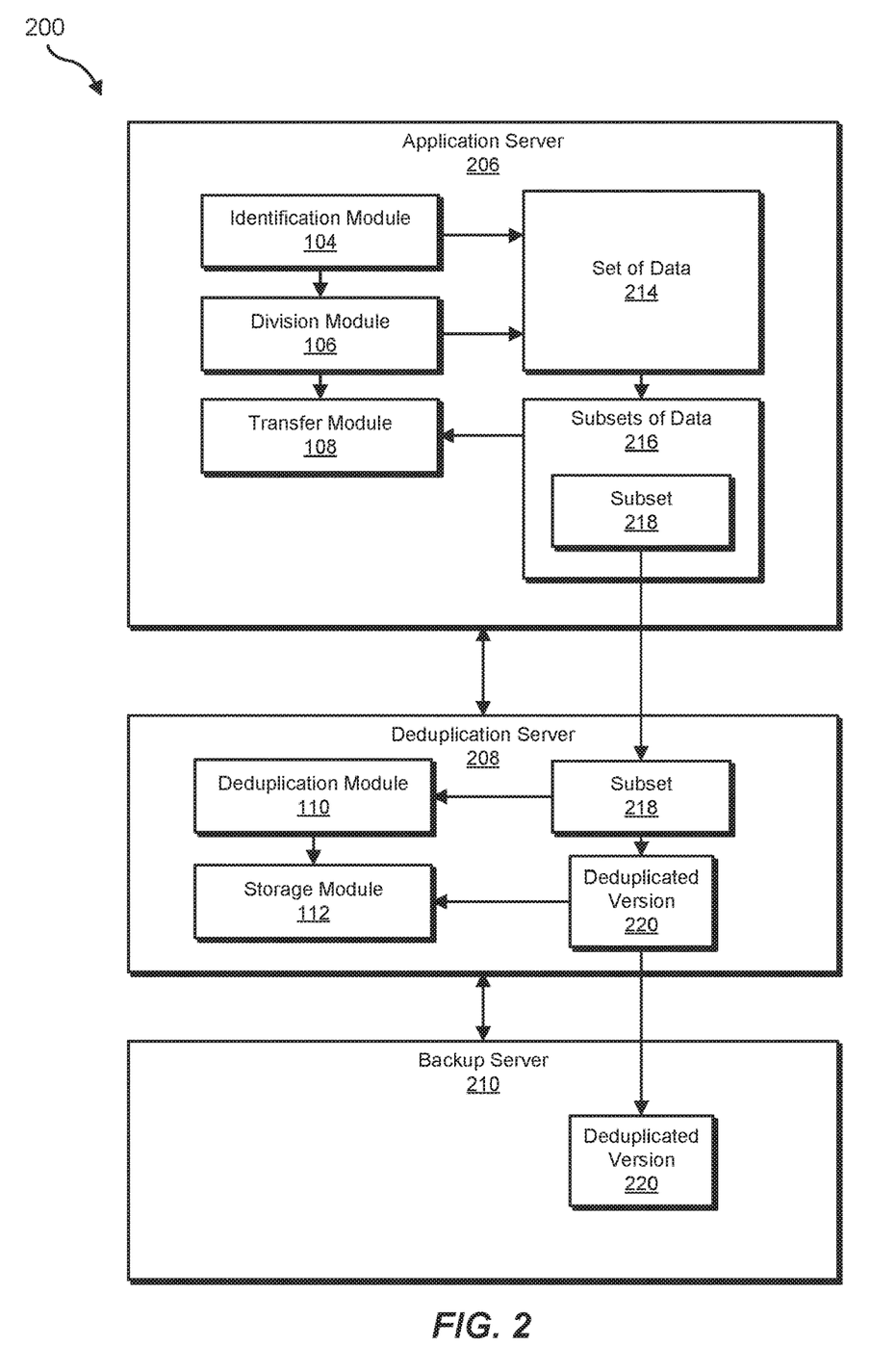
FIG. 2 is a block diagram of an additional example system for efficiently backing up large datasets.
Figure 3:
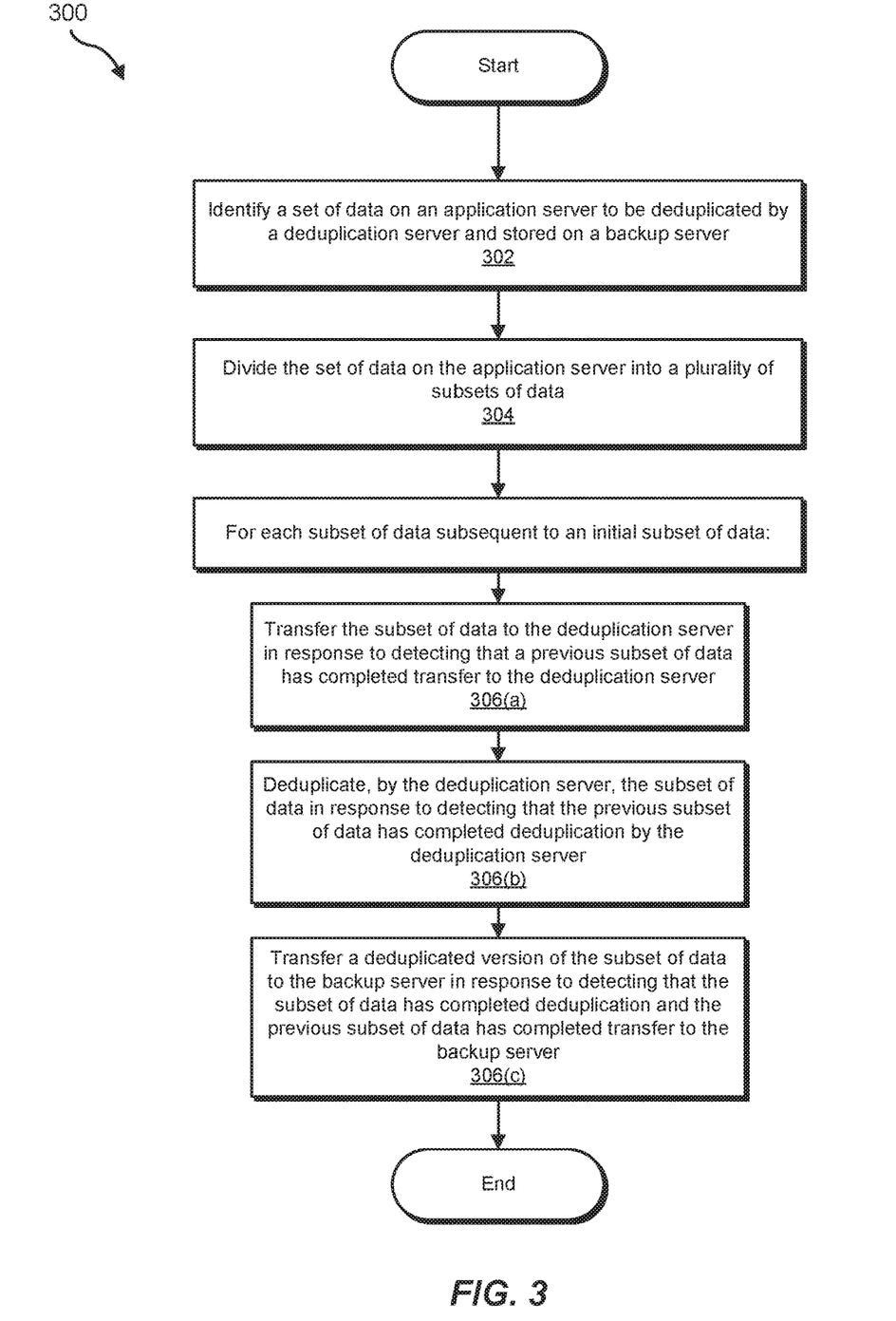
FIG. 3 is a flow diagram of an example method for efficiently backing up large datasets.
Figure 4:
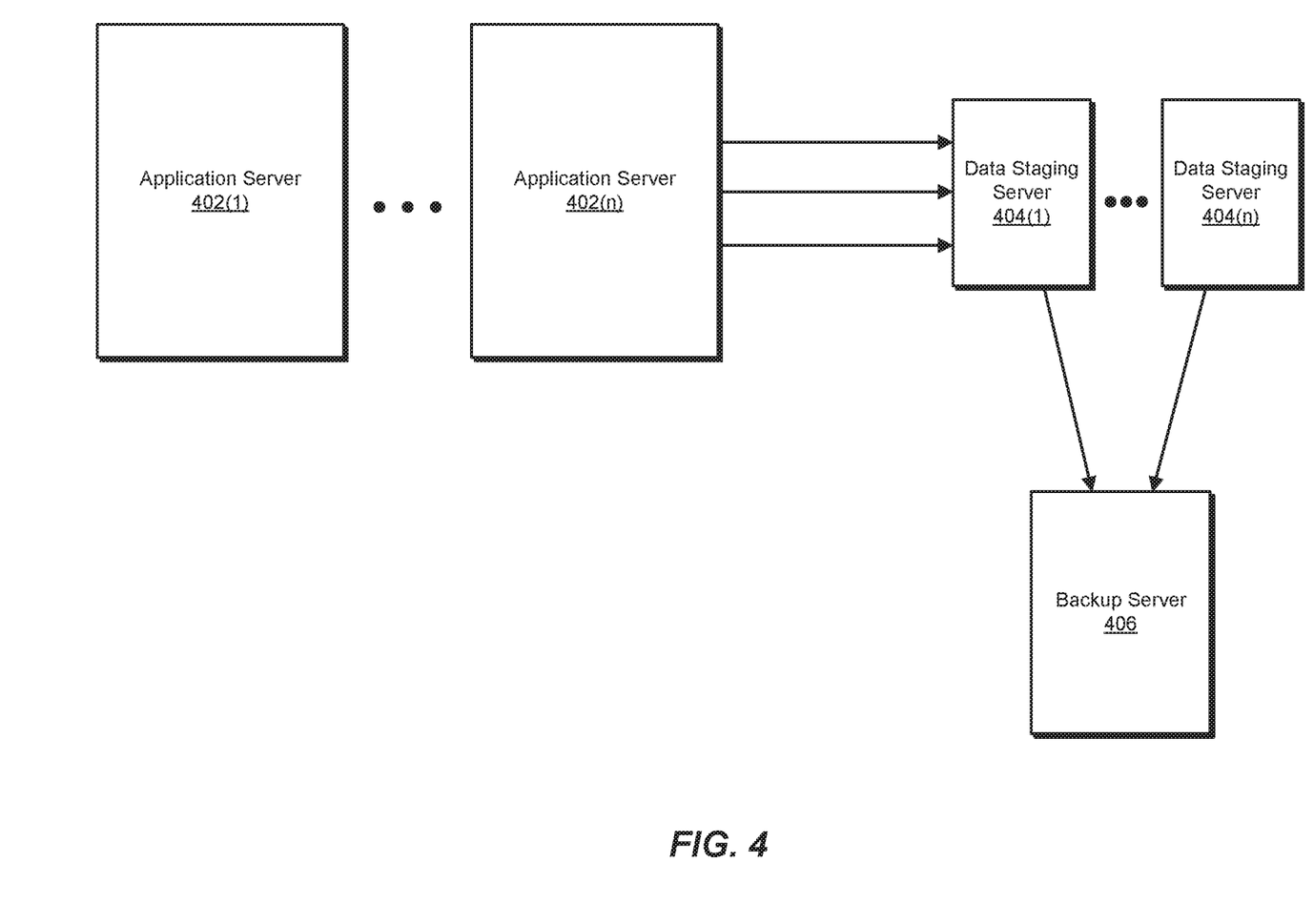
FIG. 4 is a block diagram of an example system for efficiently backing up large datasets with multiple servers.

The following will provide, with reference to FIGS. 1, 2, and 4, detailed descriptions of exemplary systems for efficiently backing up large datasets. Detailed descriptions of corresponding computer-implemented methods will also be provided in connection with FIGS. 3 and 5.

FIG. 1 is a block diagram of example system 100 for efficiently backing up large datasets. As illustrated in this figure, example system 100 may include one or more modules 102, stored in memory 140, for performing one or more tasks. For example, and as will be explained in greater detail below, example system 100 may include an identification module 104 that, when executed by a physical processor 130, identifies a set of data on an application server to be deduplicated by a deduplication server and stored on a backup server. Example system 100 may additionally include a division module 106 that divides the set of data on the application server into a plurality of subsets of data. Example system 100 may also include a transfer module 108 that transfers the subset of data to the deduplication server in response to detecting that a previous subset of data has completed transfer to the deduplication server. Example system 100 may additionally include a deduplication module 110 that deduplicates, by the deduplication server, the subset of data in response to detecting that the previous subset of data has completed deduplication by the deduplication server. Example system 100 may include a storage module 112 that transfers a deduplicated version of the subset of data to the backup server in response to detecting that the subset of data has completed deduplication and the previous subset of data has completed transfer to the backup server. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., application server 206, deduplication server 208, and/or backup server 210). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 in order to efficiently back up a large data set. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Exemplary system 100 in FIG. 1 may be implemented in a variety of ways. For example, all or a portion of exemplary system 100 may represent portions of exemplary system 200 in FIG. 2. As shown in FIG. 2, system 200 may include an application server 206 (which may, e.g., represent a cluster of application servers), a deduplication server 208, and/or a backup server 210. In one example, application server 206, deduplication server 208, and/or backup server 210 may be programmed with one or more of modules 102.

In one embodiment, one or more of modules 102 from FIG. 1 may, when executed by at least one processor of application server 206, deduplication server 208, and/or backup server 210, enable application server 206, deduplication server 208, and/or backup server 210 to efficiently back up large datasets. For example, and as will be described in greater detail below, identification module 104 may identify a set of data 214 on an application server 206 to be deduplicated by a deduplication server 208 and then stored on a backup server 210. Next, division module 106 may divide set of data 214 on application server 206 into a plurality of subsets of data 216. Transfer module 108 may then transfer a subset 218 to deduplication server 208 in response to detecting that a previous subset has completed transfer to deduplication server 208. Next, deduplication module 110 may deduplicate, on deduplication server 208, subset 218 in response to detecting that the previous subset has completed deduplication by deduplication server 208. Finally, storage module 112 may transfer a deduplicated version 220 of subset 218 to backup server 210 in response to detecting that subset 218 has completed deduplication and the previous subset has completed transfer to backup server 210.

Application server 206 generally represents any type or form of computing device that is capable of hosting applications and/or data. Examples of application server 206 include, without limitation, application servers and database servers configured to provide various database services and/or run certain software applications. In some embodiments, application server 206 may be a production server that is accessible by computing devices operated by end users.

Deduplication server 208 generally represents any type or form of computing device that is capable of performing data reduction and/or deduplication. In some embodiments, deduplication server 208 may be configured with specialized deduplication software designed to receive data from a database and remove duplicate data for more efficient storage.

Backup server 210 generally represents any type or form of computing device that is capable of storing data. In some embodiments, backup server 210 may be configured with backup software designed to efficiently store, organize, and/or retrieve backup data. In some embodiments, backup server 210 may be configured to store one or more complete backups of the data on application server 206.

In some examples, application server 206, deduplication server 208, and/or backup server 210 may be connected via one or more networks. These networks generally represent any medium or architecture capable of facilitating communication or data transfer. In some examples, these networks may facilitate communication or data transfer using wireless and/or wired connections. Examples of such networks include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, or any other suitable network.

Many other devices or subsystems may be connected to system 100 in FIG. 1 and/or system 200 in FIG. 2. Conversely, all of the components and devices illustrated in FIGS. 1 and 2 need not be present to practice the embodiments described and/or illustrated herein. The devices and subsystems referenced above may also be interconnected in different ways from that shown in FIG. 2. Systems 100 and 200 may also employ any number of software, firmware, and/or hardware configurations. For example, one or more of the example embodiments disclosed herein may be encoded as a computer program (also referred to as computer software, software applications, computer-readable instructions, and/or computer control logic) on a computer-readable medium.

The term "computer-readable medium," in some examples, may refer to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

FIG. 3 is a flow diagram of an exemplary computer-implemented method 300 for efficiently backing up large datasets. The steps shown in FIG. 3 may be performed by any suitable computer-executable code and/or computing system. In some embodiments, the steps shown in FIG. 3 may be performed by one or more of the components of system 100 in FIG. 1 and/or system 200 in FIG. 2. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may identify a set of data on an application server to be deduplicated by a deduplication server and stored on a backup server. For example, identification module 104 may identify a set of data 214 on application server 206 that is to be deduplicated by deduplication server 208 and then stored on backup server 210.

Identification module 104 may identify the set of data in a variety of ways and/or contexts. For example, identification module 104 may identify the set of data as part of a scheduled backup operation that automatically backs up a specified set of data. Additionally or alternatively, identification module 104 may discover the set of data as part of a backup operation to back up data that meets certain parameters (e.g., hosted on a certain server, more recent than a certain time, etc.). In some examples, identification module 104 may identify the set of data as part of a manually-initiated backup operation.

In one example, the set of data may include a set of columns of a database on the application server. In some examples, the set of data may include all columns of the database and/or columns from multiple databases (e.g., iterations and/or copies of the same database, separate but related databases, and/or unrelated databases). In other examples, the set of data may not include all columns of the database.

In some embodiments, the set of data may be larger than the available storage on the deduplication server. For example, the set of data may be a full backup of a cluster of application servers that includes petabytes of data and the deduplication server may only have terabytes of storage. In some examples, the deduplication server may have insufficient storage to store the entire set of data from the application server at once. In some embodiments, the application server may have a greater amount of storage than the deduplication server (thus enabling the application server to be able to store the entire set of data).

At step 304, one or more of the systems described herein may divide the set of data on the application server into a plurality of subsets of data. For example, division module 106 may divide set of data 214 on application server 206 into subsets of data 216.

The term "subset," in some examples, may refer to any portion of a set of data that does not include the entirety of the set of data. In some embodiments, a subset of a set of data may be a data segment. In one example, a data set may be a set of columns from a database and a subset of data may be a collection of one or more columns that excludes one or more additional columns.

In some examples, the set of data on the application server may occupy a significant amount of storage space (e.g., multiple petabytes). However, by segmenting the data, the systems described herein may enable the data to be processed on a much smaller deduplication server than would be possible otherwise. Specifically, the deduplication server's storage may be scaled to process a segment of data at a time rather than setting its storage to be equal in size to the application server (as would be required to process the entire set of data at once). Having a smaller rather than a larger deduplication server may save a significant amount of resources (e.g., physical hardware, hosting expenses, energy expenditure, etc.). Because a deduplication server may not be in constant use (e.g., may only be used during periodic backup creation) and may otherwise remain idle, a smaller deduplication server capable of processing one segment of data at a time may be a much more efficient use of resources than a larger deduplication server capable of processing an entire large set of data at once.

Division module 106 may divide the data into subsets in a variety of ways. For example, division module 106 may assign database columns to subsets such that each subset of data is of a similar size (e.g., within a 10% variation) and/or such that most subsets of data are of similar size (e.g., a few subsets containing columns of uncommon size may not be within the standard variation). In some examples, division module 106 may divide the set of data on the application server into the subsets of data by dividing the set of data such that each subset occupies less space in storage than an amount of space in storage available on the deduplication server. For example, if the deduplication server has 100 terabytes of storage, division module 106 may divide the set of data into subsets that are each 100 terabytes or less in size. In one example, division module 106 may divide the set of data into a set of subsets of 100 terabytes, 96 terabytes, 80 terabytes, 98 terabytes, and 56 terabytes, due to the sizes of the columns in the set of data not combining into groups sized at exactly 100 terabytes. In one embodiment, division module 106 may divide the data such that each subset occupies less space in storage than half of the storage available on the deduplication server. For example, if the deduplication server has 80 terabytes of storage, division module 106 may divide the data such that each subset occupies 40 terabytes or less.

In some examples, division module 106 may divide the set of data on the application server into the plurality of subsets of data by dividing the set of data such that each subset is a unique dataset subject to deduplication independent of each other subset. If data within a large data set is duplicated across subsets, a deduplication process that functions on one subset at a time may not remove all instances of duplicate data within the data set. In order to facilitate efficient deduplication, the systems described herein may organize the subsets such that all or most (e.g., 90%) duplicates of any given piece of data are within the same subset as the piece of data.

At step 306, one or more of the systems described herein may transfer the subset of data to the deduplication server in response to detecting that a previous subset of data has completed transfer to the deduplication server. For example, transfer module 108 may transfer subset 218 to deduplication server 208 in response to detecting that a previous subset has completed transfer to deduplication server 208.

Transfer module 108 may transfer the subset to the deduplication server in a variety of ways and/or contexts. For example, the application server and the deduplication server may be co-located and transfer module 108 may transfer the subset of data via a local and/or wired connection (e.g., an ethernet cable). Additionally or alternatively, transfer module 108 may transfer the subset of data via a remote and/or wireless connection. In some examples, transfer module 108 may transfer an initial subset of data without being prompted by the completion of any previous subset and may then transfer each subsequent subset in response to detecting that the previous subset has completed transfer. In some examples, transfer module 108 may transfer a subsequent subset of data to the deduplication server while the previous subset is being deduplicated by the deduplication server.

By transferring data while other data is being deduplicated, the systems described herein may minimize resource idle time. In traditional systems, one segment of data may go through each step of transfer from the application server to the deduplication server, deduplication, and then transfer from the deduplication to the backup server before the next segment of data is transferred from the application server to the deduplication server. In such systems, two thirds of the resources may be idle at any given time. For example, when a data segment is being transferred from the application server to the deduplication server, the processing resources on the deduplication server may be idle and the bandwidth to transfer data between the deduplication server and backup server may be unused. In another traditional example, when a data segment is being deduplicated, the bandwidth to transfer data between the application server and deduplication server may be unused and the bandwidth to transfer data between the deduplication server and the application server may be unused. Similarly, when a data segment is being transferred to the backup server, the bandwidth to transfer data between the application server and deduplication server may be unused and the processing resources on the deduplication server may be idle. In contrast, by pipelining data such that each step of the process is being performed on a different subset of the data at any given time, the systems described herein may minimize the time during which resources are idle, increasing the system's overall efficiency.

At step 308, one or more of the systems described herein may deduplicate, by the deduplication server, the subset of data in response to detecting that the previous subset of data has completed deduplication by the deduplication server. For example, deduplication module 110 may deduplicate subset 218 in response to detecting that the previous subset has completed deduplication by deduplication server 208.

Deduplication module 110 may deduplicate the subset of data in a variety of ways and/or contexts. For example, deduplication module 110 may combine and/or remove duplicate data and/or perform any suitable type of data reduction. In some embodiments, deduplication module 110 may deduplicate a subset of data in response to detecting that the previous subset of data has finished being deduplicated. Additionally, deduplication module 110 may deduplicate a subset of data in response to detecting that the subset of data has completed transfer to the deduplication server. In some examples, deduplication module 110 may deduplicate the initial subset of data without being prompted by detecting that a previous subset has completed deduplication. By deduplicating each subset of data as soon as the prior subset has finished deduplication, the systems described herein may minimize idle time of resources on the deduplication server and/or may improve the speed by which the set of data is deduplicated.

At step 310, one or more of the systems described herein may transfer a deduplicated version of the subset of data to the backup server in response to detecting that the subset of data has completed deduplication and the previous subset of data has completed transfer to the backup server. For example, storage module 112 may transfer deduplicated version 220 of subset 218 to backup server 210 in response to detecting that subset 218 has completed deduplication and the previous subset has completed transfer to backup server 210.

Storage module 112 may transfer the deduplicated version of the subset of data in a variety of ways and/or contexts. For example, the deduplication server and the backup server may be co-located and storage module 112 may transfer the subset of data via a local and/or wired connection (e.g., an ethernet cable). Additionally or alternatively, storage module 112 may transfer the subset of data via a remote and/or wireless connection. In some examples, storage module 112 may transfer the initial subset of data to the backup server without being prompted by the completion of the transfer of a previous subset. By transferring data to the backup server as soon as a previous subset of data has finished transfer, the systems described herein may minimize the time that bandwidth between the deduplication server and backup server is unused and/or may speed up the backup process.

Although illustrated as individual devices, in some embodiments, one or more of the servers described herein may represent a cluster of servers and/or a set of clusters of servers. As illustrated in FIG. 4, in some embodiments, a cluster of application servers including application server 402(1) through application server 402(n) may store data. In some examples, the systems described herein may transfer data from application servers 402(1) through 402(n) to any or all of data staging servers 404(1) through 404(n). In some embodiments, the systems described herein may transfer data in parallel from application servers 402(1) through 402(n) to data staging servers 404(1) through 404(n). In one embodiment, data staging servers 404(1) through 404(n) may represent deduplication servers and/or may perform various data deduplication and/or data reduction operations. In some embodiments, the systems described herein may transfer data from data staging servers 404(1) through 404(n) to a backup server 406. In some embodiments, backup server 406 may represent multiple servers and/or clusters of servers and/or one or more backup servers and a backup master server that directs, coordinates, and/or controls backup servers.

Figure 5:
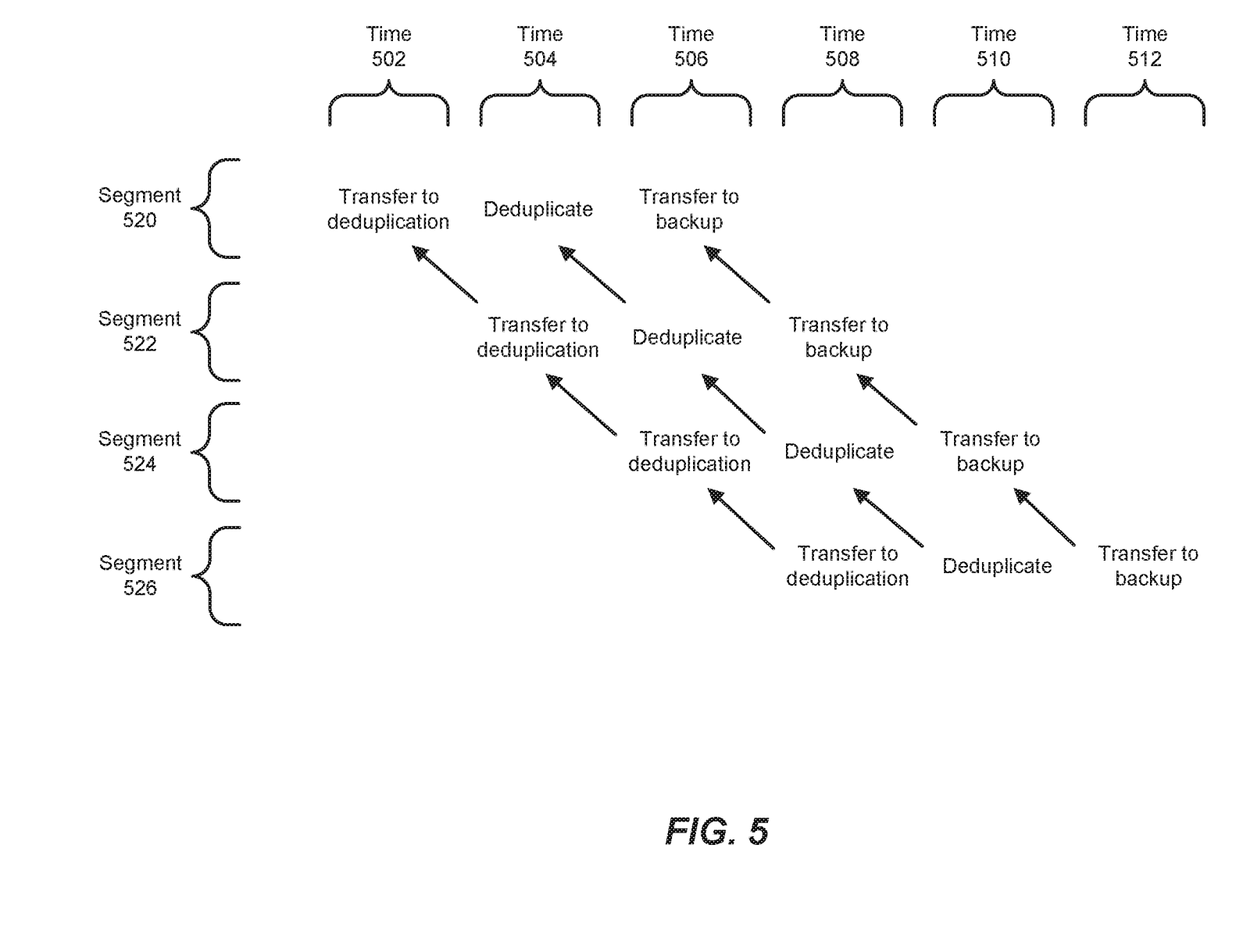
FIG. 5 is a graph of an example system for efficiently backing up large datasets.

In some embodiments, the systems described herein may pipeline data segments such that, at most points in time, network bandwidth between and storage bandwidth on all of the involved servers is being utilized. For example, as illustrated in FIG. 5, at time 502 the systems described herein may transfer a segment 520 to the deduplication server, utilizing storage bandwidth on the application server and the deduplication server and network bandwidth between the application server and deduplication server. At time 504, the systems described herein may deduplicate segment 520 and may transfer a segment 522 to the deduplication server. In some examples, at time 506, the systems described herein may transfer a deduplicated version of segment 520 to a backup server, deduplicate segment 522, and transfer a segment 524 to the deduplication server. In one example, at time 506, the systems described herein may utilize storage bandwidth on the application server, deduplication server, and backup server as well as network bandwidth between the application server and deduplication server and between the deduplication server and backup servers.

In one example, at time 508, the systems described herein may transfer a deduplicated version of segment 522 to the backup server, deduplicate segment 524, and transfer a segment 526 to the deduplication server. At time 510, the systems described herein may transfer a deduplicated version of segment 524 to the backup server and deduplicate segment 526. At step 512, the systems described herein may transfer a deduplicated version of segment 526 to the backup server, completing the backup process for all of the data segments in the set of data.

As detailed above, by segmenting and pipelining data, the systems described herein may improve backup creation efficiency by reducing and/or minimizing the idle time of various system resources, including hard drive memory, solid state drive memory, random access memory, central processing unit power, network bandwidth, and/or any other suitable resources. In some traditional approaches, resources may be left idle during the backup process as each segment moves, one at a time, through each stage of transfer from the application server, deduplication, and transfer to the backup server. Pipelining the data segments such that each segment starts a step of the process as soon as the previous segment finishes the step may reduce the time that resources are idle and/or improve the speed of the backup process. For example, because the systems described herein are acting simultaneously on three data segments rather than a single one, the systems described herein may improve on traditional systems by a factor of two or three in terms of the speed at which the backup process is completed.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the modules described herein may configure a computing system (e.g., a server) to facilitate multi-tenancy for one or more of the functions described herein. For example, one or more of the modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. In some examples, the term "virtual machine" may refer to any operating system environment that is abstracted from computing hardware by a virtual machine manager (e.g., a hypervisor).

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), variations or combinations of one or more of the same, or any other suitable mobile computing devices. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using modules that perform certain tasks. These modules may include script, batch, or other executable files that may be stored on a computer-readable storage medium or in a computing system. In some embodiments, these modules may configure a computing system to perform one or more of the example embodiments disclosed herein.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for efficiently backing up large datasets, at least a portion of the method being performed by a computing device comprising at least one processor, the method comprising:
    identifying a set of data on an application server, the application server comprising an application data storage, to be deduplicated by a deduplication server, the deduplication server comprising a deduplication data storage, and stored on a backup server;
    dividing the set of data on the application server into a plurality of subsets of data; and
    for each subset of data subsequent to an initial subset of data:
        in response to detecting that a previous subset of data has completed transfer to the deduplication data storage, transferring the subset of data from the application data storage to the deduplication data storage while the deduplication server performs deduplication of the previous subset of data;
        in response to detecting that the previous subset of data has completed deduplication by the deduplication server and that the subset of data has completed transfer to the deduplication data storage, deduplicating, by the deduplication server, the subset of data while the deduplication server transfers the previous subset of data to the backup server; and
        in response to detecting that the previous subset of data has completed transfer to the backup server and that the subset of data has completed deduplication at the deduplication server, transferring a deduplicated version of the subset of data to the backup server.

2. The computer-implemented method of claim 1, wherein dividing the set of data on the application server into the plurality of subsets of data comprises dividing the set of data such that each subset is a unique dataset subject to deduplication independent of each other subset.

3. The computer-implemented method of claim 1, wherein dividing the set of data on the application server into the plurality of subsets of data comprises dividing the set of data such that each subset occupies less space in storage than an amount of space in storage available on the deduplication server.

4. The computer-implemented method of claim 1, wherein the set of data comprises a set of columns of a database on the application server.

5. The computer-implemented method of claim 1, wherein the application server comprises a cluster of application servers.

6. The computer-implemented method of claim 1, wherein the deduplication server comprises a cluster of deduplication servers.

7. The computer-implemented method of claim 1, wherein the application server comprises a greater amount of storage than the deduplication server.

8. The computer-implemented method of claim 1, wherein the deduplication server comprises insufficient storage to store the set of data from the application server.

9. A system for efficiently backing up large datasets, the system comprising:
- an identification module, stored in memory, that identifies a set of data on an application server, the application server comprising an application data storage, to be deduplicated by a deduplication server, the deduplication server comprising a deduplication data storage, and stored on a backup server;
- a division module, stored in memory, that divides the set of data on the application server into a plurality of subsets of data;
- a transfer module, stored in memory, that, for each subset of data subsequent to an initial subset of data, in response to detecting that a previous subset of data has completed transfer to the deduplication data storage, transfers the subset of data from the application data storage to the deduplication data storage while the deduplication server performs deduplication of the previous subset of data;
- a deduplication module, stored in memory, that, for each subset of data subsequent to the initial subset of data, in response to detecting that the previous subset of data has completed deduplication by the deduplication server and that the subset of data has completed transfer to the deduplication data storage, deduplicates, by the deduplication server, the subset of data while the deduplication server transfers the previous subset of data to the backup server;
- a storage module, stored in memory, that, for each subset of data subsequent to the initial subset of data, in response to detecting that the previous subset of data has completed transfer to the backup server and that the subset of data has completed deduplication at the deduplication server, transfers a deduplicated version of the subset of data to the backup server; and
- at least one physical processor configured to execute the identification module, the division module, the transfer module, the deduplication module, and the storage module.

10. The system of claim 9, wherein the division module divides the set of data on the application server into the plurality of subsets of data by dividing the set of data such that each subset is a unique dataset subject to deduplication independent of each other subset.

11. The system of claim 9, wherein the division module divides the set of data on the application server into the plurality of subsets of data by dividing the set of data such that each subset occupies less space in storage than an amount of space in storage available on the deduplication server.

12. The system of claim 9, wherein the set of data comprises a set of columns of a database on the application server.

13. The system of claim 9, wherein the application server comprises a cluster of application servers.

14. The system of claim 9, wherein the deduplication server comprises a cluster of deduplication servers.

15. The system of claim 9, wherein the application server comprises a greater amount of storage than the deduplication server.

16. The system of claim 9, wherein the deduplication server comprises insufficient storage to store the set of data from the application server.

17. A non-transitory computer-readable medium comprising one or more computer-readable instructions that, when executed by at least one processor of a computing device, cause the computing device to:
- identify a set of data on an application server, the application server comprising an application data storage, to be deduplicated by a deduplication server, the deduplication server comprising a deduplication data storage, and stored on a backup server;
- divide the set of data on the application server into a plurality of subsets of data; and
- for each subset of data subsequent to an initial subset of data:
  - in response to detecting that a previous subset of data has completed transfer to the deduplication data storage, transfer the subset of data from the application data storage to the deduplication data storage while the deduplication server performs deduplication of the previous subset of data;
  - in response to detecting that the previous subset of data has completed deduplication by the deduplication server and that the subset of data has completed transfer to the deduplication data storage, deduplicate, by the deduplication server, the subset of data while the deduplication server transfers the previous subset of data to the backup server; and
  - in response to detecting that the previous subset of data has completed transfer to the backup server and that the subset of data has completed deduplication at the deduplication server, transfer a deduplicated version of the subset of data to the backup server.

18. The non-transitory computer-readable medium of claim 17, wherein the one or more computer-readable instructions cause the computing device to divide the set of data on the application server into the plurality of subsets of data by dividing the set of data such that each subset is a unique dataset subject to deduplication independent of each other subset.

19. The non-transitory computer-readable medium of claim 17, wherein the one or more computer-readable instructions cause the computing device to divide the set of data on the application server into the plurality of subsets of data by dividing the set of data such that each subset occupies less space in storage than an amount of space in storage available on the deduplication server.

20. The non-transitory computer-readable medium of claim 17, wherein the set of data comprises a set of columns of a database on the application server.

* * * * *